United States Patent
Richter et al.

(10) Patent No.: US 10,144,267 B2
(45) Date of Patent: Dec. 4, 2018

(54) MODE DOOR WITH INTEGRATED STRATIFICATION FEATURES

(71) Applicant: Halla Visteon Climate Control Corp., Daejeon (KR)

(72) Inventors: Gerald Richter, Aachen (DE); Evzi Duka, Köln (DE); Sezgin Gökcen, Köln (DE); Michael Fietz, Aachen (DE)

(73) Assignee: HANON SYSTEMS, Daejeon (KR)

( * ) Notice: Subject to any disclaimer, the term of this patent is extended or adjusted under 35 U.S.C. 154(b) by 230 days.

(21) Appl. No.: 14/857,922

(22) Filed: Sep. 18, 2015

(65) Prior Publication Data

US 2016/0082807 A1 Mar. 24, 2016

(30) Foreign Application Priority Data

Sep. 18, 2014 (DE) .................. 10 2014 113 471

(51) Int. Cl.
*B60H 1/00* (2006.01)

(52) U.S. Cl.
CPC ....... *B60H 1/00564* (2013.01); *B60H 1/0005* (2013.01); *B60H 2001/00092* (2013.01)

(58) Field of Classification Search
CPC .............. B60H 1/00564; B60H 1/0005; B60H 2001/00092
USPC ........................................................ 454/160
See application file for complete search history.

(56) References Cited

U.S. PATENT DOCUMENTS

| 6,609,389 B2 * | 8/2003 | Ozeki ................. B60H 1/0005 454/121 |
| 7,798,207 B2 * | 9/2010 | Tarukawa .......... B60H 1/00678 165/100 |
| 8,544,533 B2 * | 10/2013 | Lee .................... B60H 1/00064 165/202 |

(Continued)

FOREIGN PATENT DOCUMENTS

| CN | 1157782 A | 8/1997 |
| DE | 3826182 C1 | 10/1989 |

(Continued)

OTHER PUBLICATIONS

Ikeda, Katsuyuki, EP1445133 Translation.pdf, "Airconditioning system for automobiles", Feb. 2003, pp. 1-6.*

(Continued)

*Primary Examiner* — Gregory Huson
*Assistant Examiner* — Ryan Faulkner
(74) *Attorney, Agent, or Firm* — Shumaker, Loop & Kendrick, LLP (57) ABSTRACT

A device for guiding air for an air conditioning system of a motor vehicle. The air conditioning system includes air outlets. The device is designed so that it encloses a volume and within the volume at least one air channel extending continuously from an inlet to an outlet is formed. The device is arranged in such a way that can be shifted in a continuously variable manner in a direction between two end positions, wherein the device in the end positions in each case closes an air outlet.

The device may be arranged in an air conditioning system for a motor vehicle with means for conveying, for cooling and for heating an air mass flow, including a housing with a mixing chamber, in which the device for guiding air is arranged.

16 Claims, 3 Drawing Sheets

(56) References Cited

U.S. PATENT DOCUMENTS

2004/0069484 A1 4/2004 Tokunaga et al.
2004/0094294 A1 5/2004 Zheng et al.

FOREIGN PATENT DOCUMENTS

| | | |
|---|---|---|
| DE | 10211190 A1 | 9/2003 |
| DE | 102004056814 A1 | 8/2005 |
| EP | 1273465 A1 | 1/2003 |
| EP | 1445133 A2 | 8/2004 |
| EP | 1445133 A2 | 11/2004 |
| JP | H09290618 A | 11/1997 |
| JP | 2003002034 A | 1/2003 |
| JP | 2009035070 A | 2/2009 |
| KR | 10-2012-0047981 A | 11/2013 |
| KR | 20130124685 A | 11/2013 |
| KR | 20140083291 A | 7/2014 |

OTHER PUBLICATIONS

Harada, Nobumichi, JP2009035070 Translation.pdf, "Vehicular air conditioner", Jul. 2007, pp. 1-26.*

* cited by examiner

PRIOR ART

MODE DOOR WITH INTEGRATED STRATIFICATION FEATURES

CROSS-REFERENCE TO RELATED APPLICATION

This patent application claims priority to German Non-Provisional Patent Application Serial No. DE 10 2014 113 471.0 filed Sep. 18, 2014, hereby incorporated herein by reference in its entirety.

FIELD OF THE INVENTION

The invention relates to a device for guiding air for an air conditioning system of a motor vehicle. The device is designed so as to enclose a volume, wherein within the volume at least one air channel extending continuously from an inlet to an outlet is formed.

Moreover, the invention relates to an air conditioning system for a motor vehicle with means for conveying, for cooling, and for heating an air mass flow. The housing comprises at least two flow paths designed so that they lead into a mixing chamber, whereby an air mass flow led through the first flow path has a first temperature and an air mass flow led through the second flow path has a second temperature. The device for guiding air is arranged within the mixing chamber.

BACKGROUND OF THE INVENTION

In motor vehicles, due to the increasing number of technical components, an optimization with regard to the installation volume is necessary, in order to be able to ensure generally the desired functionality by accommodating the components. For this reason, large-volume components for air conditioning, as known from stationary air conditioning units in the form of mixing chambers, flow guiding devices and vortexing devices, cannot be used in motor vehicles due to the space constraints.

An additional requirement for an air conditioning unit of a motor vehicle, which conditions a supplied air mass flow, optionally divides it and leads the individual air mass flows into different areas of the motor vehicle, consists in applying air mass flows at different temperatures to different air outlets of the air conditioning system, depending on position and function. As is known, the passenger compartment of motor vehicles has different comfort and ventilation zones. The air conditioning system of the motor vehicle offers a defined air quantity with a defined temperature for the respective zones, depending on the operating mode selected.

In the process, the supplied air mass flow is led over different heat exchangers, so that the air is cooled and dehumidified and also, if necessary, heated again and subsequently guided to the respective allocated zones via adjustable flaps into the passenger compartment. Here, the air is blown, for example, into the foot space as well as through openings in the dashboard into the passenger compartment and, in addition, it is guided via outlets directly to the windshield in order to keep it free of condensation or to defrost it.

In the case of air conditioning systems regulated on the air side according to the preamble, the air mass flow to be supplied to the passenger compartment is divided into two partial air mass flows, after flowing over a heat exchanger operated as an evaporator, by means of a flap, also referred to as temperature flap. By means of the temperature flaps and the different regulating mechanisms, the required temperatures of the air flows are set. In the process, one partial air mass flow is guided through a heating heat exchanger and heated. At the same time, the second partial air mass flow flows as cold air past the heating heat exchanger. The two partial air mass flows at different temperatures are subsequently mixed to reach the required target temperature and/or are separately conveyed further to the air outlets.

As is known, the flaps are adjusted by rotation or shifting. Depending on the rotation and/or shifting of the individual flaps within the air conditioning system, defined air quantities at defined temperatures are supplied to the individual zones in the passenger compartment. In the process, additional fittings are necessary within the air conditioning system, in order to ensure the desired air quantity distribution and temperature distribution. The mutually different temperatures of the air mass flows at the different outlets are referred to as temperature stratification. The so-called stratification fittings or channels tap cold or hot air mass flows from certain areas within the housing of the air conditioning system and lead them via channel-shaped designs to other areas in the housing. In contrast to the flaps, the stratification fittings are arranged rigidly and statically.

In EP 1 273 465 A1, an air conditioning unit for a motor vehicle is described. The air conditioning unit comprises a housing with an air inlet and air outlets, an evaporator and heating heat exchanger arranged in the housing, movable, in particular rotatable air guide elements in the form of temperature flaps as well as a static air guide element. The static air guide element is used for leading a portion of the heated air mass flow in a targeted manner from the heating heat exchanger to a first air outlet as well as for leading of a portion of the cold air mass flow, which has not been led through the heating heat exchanger, in a targeted manner to a second air outlet.

In EP 1 445 133 A2, an air conditioning unit for motor vehicles is disclosed. The air conditioning unit comprises a cold air passage, a hot air passage, and a deflection plate. The deflection plate is arranged at a site where the cold air passage and the hot air passage merge. The deflection plate is constructed with multiple cold air flow openings, which lead cold air from the cold air passage to a first outlet, and with multiple hot air guide channels oriented perpendicularly to the cold air flow openings, which lead hot air from the hot air passage to a second outlet and which are open on the outlet side.

The systems known in the prior art are characterized in that they comprise additional elements at a very high equipment expense, which require additional space and entail costs and also an additional installation effort as well as a corresponding maintenance effort. Moreover, when using the known flaps, it is moreover not possible to set the desired air quantity distribution and temperature distribution in each operating mode.

Moreover, the additional fittings, such as the mentioned hot and cold air channels of rigid and static design, which provide support for the temperature stratification only in certain setting ranges, lead to delimitations and constrictions within the housing and consequently elevated pressure losses in the air flow, which in turn leads to an elevated power demand and thus energy consumption as well as to a reduction of the efficiency of the air conditioning system and thus of the entire motor vehicle. Moreover, the maximum air quantities that can be achieved within the air conditioning system are reduced.

SUMMARY OF THE INVENTION

The present invention has the problem of making available an air conditioning system with heating functionality, especially for being used in motor vehicles. In addition, the system should be designed for the combined operation in the refrigerating system mode and the heat pump mode as well as in the reheating mode for heating, cooling, and dehumidifying the air of the passenger compartment to be conditioned. The operation should be possible to meet all requirements for a comfortable climate in the passenger compartment even in environments with low capacity heat sources such as, for example, in the case of energy-efficient internal combustion engines or hybrid drives consisting of an internal combustion engine and electromotor or in the case of non-present heat sources from the drive such as, for example, in the case of electrically driven motor vehicles.

The problem of the present invention is to provide an element for an air conditioning system, which, depending on demand, comprises a defined optimal temperature distribution of air mass flows with minimal effort for the temperature control. In the process, the air should be led in a targeted manner, and moreover the number of the components to be used and also their installation space need should be minimal. The costs arising for the production, installation and maintenance should be minimal. The operation of the air conditioning system should be possible with low pressure losses at maximum efficiency.

The problem is solved by the subject matters having the features of the independent claims. Refinements are presented in the dependent claims.

The problem is solved by a device according to the invention for guiding air for an air conditioning system of a motor vehicle. The air conditioning system comprises air outlets. The device is designed so as to enclose a volume, wherein within the volume at least one air channel extending continuously from an inlet to an outlet is arranged.

According to the design of the invention, the device is arranged so that it can be shifted in a continuously variable manner in a direction between two end positions, wherein the device in the end positions closes an air outlet in each case. The device should thus be considered to be a movable air distribution flap with at least one integrated stratification channel, and it covers in each case areas of the cross section of the paths or an entire cross section of a path to the air outlets.

According to an advantageous embodiment of the invention, within the volume enclosed by the device, at least two continuous air channels are formed, wherein the air channels are arranged separately from one another and each has an inlet and an outlet.

The air channels are advantageously separated from one another by a partition so that the air mass flows guided through the air channels are not mixed as they flow through the device. The air mass flows guided through the air channels are preferably conditioned differently, in particular at different temperatures.

According to a refinement of the invention, a first air channel extends from an upper side to a lower side of the device, which is arranged at a distance in a vertical direction from the upper side. The inlet of the first air channel is formed on the upper side and the outlet is formed on the lower side of the device. The device has a length direction, a width direction, and a depth direction. The length direction here is described with a horizontal direction and the width direction with a vertical direction. The horizontal and the vertical directions as well as the depth direction respectively are arranged perpendicularly to one another. By a movement of the device, the position of the device relative to the absolute horizontal or vertical, for example, of the air conditioning system, is modifiable. The relative horizontal and vertical directions as well as the depth direction of the device here remain unchanged.

The upper side and the lower side here delimit the volume enclosed by the device in vertical direction.

According to a preferred embodiment of the invention, the inlet and the outlet of the first air channel are arranged offset from one another in the horizontal direction arranged perpendicularly to the vertical direction. The inlet and the outlet are thus oriented in the vertical direction and the first air channel extends substantially in the horizontal direction.

An additional advantageous embodiment of the invention consists in that a second air channel extends from a front side to a back side of the device, which is arranged at a distance from the front side in a horizontal direction. Here, the inlet is formed on the front side and the outlet is formed on the back side of the device. The second air channel extends with the inlet and the outlet advantageously in the horizontal direction.

The front side and the back side delimit the volume enclosed by the device in horizontal direction. Here, the front side and the back side can also be considered to be transitional areas from the upper side and the lower side of the device.

The air channels for guiding different air mass flows therethrough are preferably arranged adjacent to one another in the depth direction of the device and, in each case, separated from one another by a partition. The partition is arranged in a plane defined by the horizontal and the vertical direction.

According to another advantageous embodiment of the invention, the device is designed so that it can be combined with an inlet channel stationarily arranged relative to the direction of the shifting. The inlet channel is rigidly, statically or stationarily connected to a housing of the air conditioning system in which the device can be moved. The device is here designed in such a way that the device, as a result of the shifting, at least partially receives the inlet channel and at least one area of the inlet channel can be introduced into the device. Here, the inlet channel is inserted into the air channel of the device.

According to a refinement of the invention, the inlet of the first air channel is constructed with an air guide device. In the area of the inlet, the air guide device protrudes from the upper side of the device and has a width of the opening of the inlet.

According to an advantageous embodiment of the invention, the inlet of the second air channel is constructed with an air guide device. In the area of the inlet, at a transition from the front side and the upper side of the device, the air guide device is designed so that it protrudes from the front side and the upper side respectively. The air guide device extends preferably over the entire depth of the device.

In the area of the first air channel, which is closed on the front side of the device, the air guide device is advantageously shaped concavely, in order to guide the air mass flow along on the front side.

According to a refinement of the invention, the movably designed device can be combined with a rigidly, statically or stationarily arranged stratification channel. The stratification channel is here preferably designed as an inlet channel, for example, for the cold air mass flow.

The problem is also solved by an air conditioning system according to the invention for a motor vehicle with means for conveying, for cooling and for heating an air mass flow. The air conditioning system comprises a housing with at least two flow paths, which are designed so that they lead into a mixing chamber, and air outlets. An air mass flow led through the first flow path as a partial air mass flow, or a portion of the entire air mass flow conveyed in the air conditioning system, has a first temperature, and an air mass flow, or a partial air mass flow, led through the second flow path, has a second temperature. The air mass flows can be guided through the flow paths and the mixing chamber to the air outlets.

According to the design of the invention, within the mixing chamber of the air conditioning system, an above-described device for guiding air according to the invention is arranged.

In addition, within the housing, an evaporator is preferably provided. Advantageously, the flow paths extend from an area downstream of the air of the evaporator in flow direction to the mixing chamber. The first flow path here is designed as a bypass for a heating heat exchanger arranged in the second flow path.

According to an advantageous embodiment of the invention, the device for guiding air device is arranged in such a way that it can that it can be shifted in a continuously variable manner in a direction between two end positions. In the end positions, the device here closes an air outlet in each case.

According to a refinement of the invention, an inlet channel is formed which is stationarily arranged relative to the direction of the shifting of the device. The inlet channel here is firmly connected to the housing of the air conditioning system and is arranged in a transitional area of the first flow path to the mixing chamber, in which the device is arranged so that it can be moved. The device and the inlet channel are arranged in such a manner with respect to one another and formed so that the device, due to the shifting, receives the inlet channel at least partially and at least an area of the inlet channel can be introduced into the device. The inlet channel is inserted into an air channel of the device during the movement of the device.

The inlet channel and the air channel of the device are preferably sealed with respect to one another in the inserted state, so that an air mass flow guided through the inlet channel and subsequently the air channel flows through almost without leakage.

The air conditioning system is advantageously designed as a 1-zone air conditioning system, in particular for an improved air conditioning of the area of the back seat in the passenger compartment of the motor vehicle. The device according to the invention for guiding air is provided as a movable and shiftable device, also referred to as an operating mode switching flap or bypass flap for the area of the back seat, in particular for the targeted setting of a temperature difference in vertical direction in the passenger compartment. With the 1-zone air conditioning system according to the invention, in connection with a 2-zone air conditioning system for the front area of the vehicle space, it is possible to provide a 3-zone air conditioning system.

In summary, in the context of the air conditioning system, the device according to the invention for guiding air has various other advantages:
  no additional space-consuming elements needed,
  minimal pressure losses, since no additional delimitations and constrictions are formed within the housing, which lead to increased pressure losses in the air flow,
  minimal blocking of the flow cross sections at the air outlets and within the mixing chamber, so that,
  for the same air capacity, a smaller blower is necessary, or, with the same blower, higher air capacities can be achieved, and thus
  minimal power demand and minimal energy consumption as well as maximum efficiency in the operation of the air conditioning system and thus of the entire motor vehicle, as well as
  variable temperature stratification by means of movable stratification channels.

DESCRIPTION OF THE DRAWINGS

Additional details, features and advantages of designs of the invention result from the following description of embodiment examples in reference to the associated drawings. The figures show.

WRITTEN DESCRIPTION OF THE INVENTION

Figure 1:
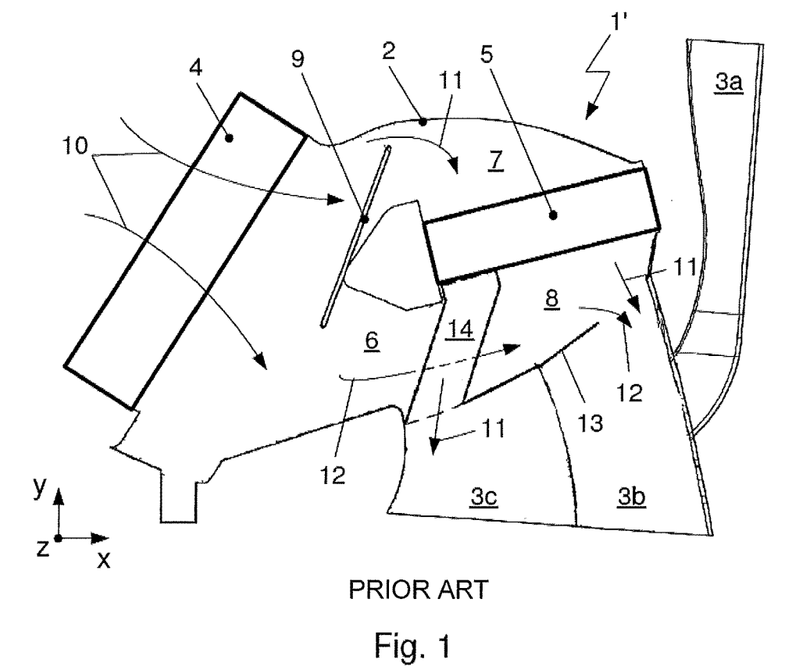
FIG. 1: air conditioning system with a mixing flap and static stratification fittings within the mixing chamber in the operation in the mixing mode in a side view from the prior art.

Represented in FIG. 1 is an air conditioning system 1' from the prior art with an air flap 13 and static stratification fittings within the mixing chamber 8 in the operation in the mixed mode in a side view. The rigid and static stratification fittings are designed as stratification channels 14.

The air conditioning system 1' comprises a blower, which is not shown, for suctioning and conveying the air in flow direction 10 through the air conditioning system 1', an evaporator 4, and a heating heat exchanger 5, which are arranged in a housing 2. The housing 2 comprises air outlets 3a, 3b, 3c and the mixing chamber 8.

The entire air mass flow suctioned by the blower and led in flow direction 10 to the evaporator 4 is directed over the heat exchanger surface of the evaporator 4 and then divided proportionately over two flow paths 6, 7. The first flow path 6, also referred to as cold air path 6, leads the air that has been cooled and/or dehumidified in the evaporator 4 as a partial air mass flow in flow direction 12 around the heating heat exchanger 5. In the process, the first flow path 6 is formed in vertical direction y under the heating heat exchanger 5, which is arranged within the second flow path 7. The entire partial air mass flow led through the second flow path 7 is guided over the heat exchanger surface of the heating heat exchanger 5 and heated. The flow path 7 is consequently also referred to as hot air path 7.

The air mass flow led over the evaporator 4 is divided by means of the opened temperature flap 9, which is designed primarily as a shifting element, into the partial air mass flows over the flow paths 6, 7. By means of the position of the temperature flap 9, the partial air mass flows through the flow paths 6, 7 can be controlled, that is to say the proportions of the entire air mass flow led through the air conditioning system 1', and thus the temperature at the air outlets 3a, 3b, 3c, can be controlled.

The first partial air mass flow guided through the cold air path 6 and the second partial air mass flow guided in flow direction 11 through the hot air path 7 are at least partially mixed in the mixing chamber 8 depending on the operating mode of the air conditioning system 1', before the now conditioned air is supplied through the individual air outlets 3a, 3b, 3c to the passenger compartment.

The air outlets 3a, 3b, 3c can be closed or opened by means of the air flap 13. According to the representation in FIG. 1, the air flap 13 is arranged in such a manner that the air outlets 3a, 3b, 3c are open. The air outlet 3a is here formed connected parallel to the air outlet 3c. The air mass flow flowing into the air outlet 3c is also guided proportionately into the air outlet 3a, so that the partial air mass flows conveyed through the air outlets 3a, 3c are conditioned identically.

The air flap 13 which is constructed with a curved cross section, which results from the plane defined by horizontal direction x and vertical direction y, is positioned in a manner so that it can be shifted within the mentioned plane and extends in depth direction z. The air flap 13 here is shifted in such a way that the air outlets 3a, 3b, 3c are alternately at least partially opened or closed.

Between the outlet from the heating heat exchanger 5 and the air outlet 3c, additional static stratification channels 14 are arranged. The stratification channels 14 are used for the targeted air guidance of a partial air mass flow flowing out of the heating heat exchanger 5 to the air outlet 3c, wherein the partial air mass flow is guided unmixed through the mixing chamber 8. The stratification channels 14 are also referred to as hot air channels based on their function.

The stratification channels 14 arranged statically in the mixing chamber 8 represent additional delimitations and constrictions within the housing 2, cause increased pressure losses in the air flow, negatively affect the air throughput as well as the acoustics and cause increased costs in the production and the operation of the air conditioning system 1'.

Figure 2A:
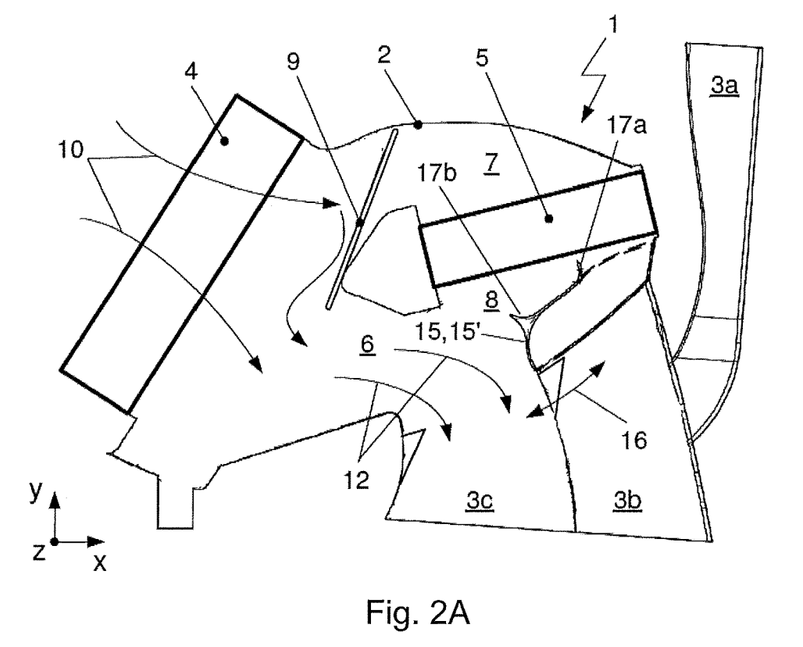
FIG. 2A: an air conditioning system with a device for guiding air with integrated air channels in a side view in a first end position during operation in the chiller mode.
Figure 2B:
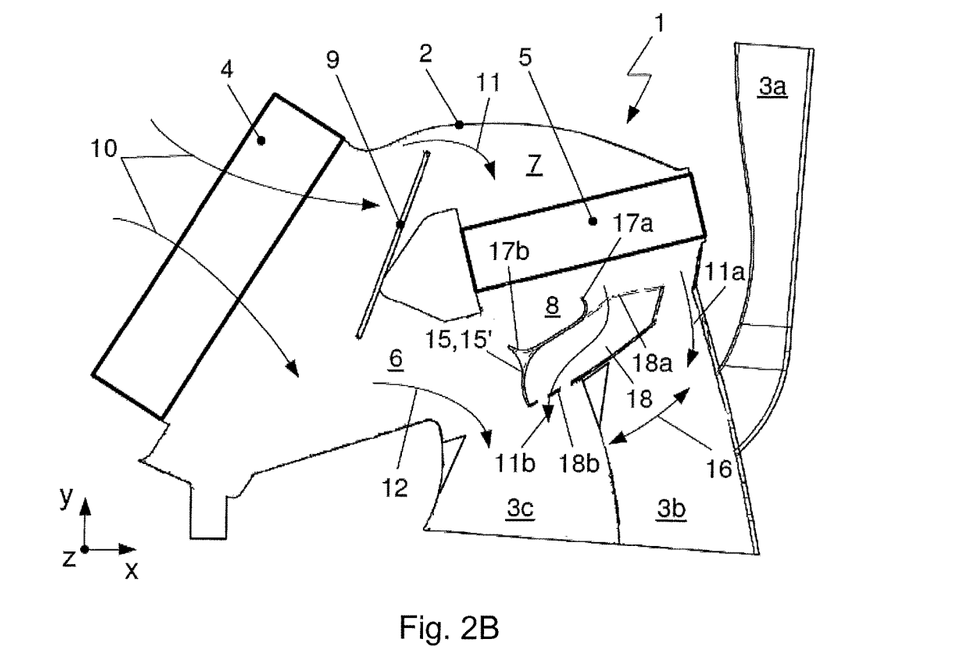
FIG. 2B: the air conditioning system of FIG. 2A with the device for guiding air in an intermediate position in the operation in the mixed mode.
Figure 2C:
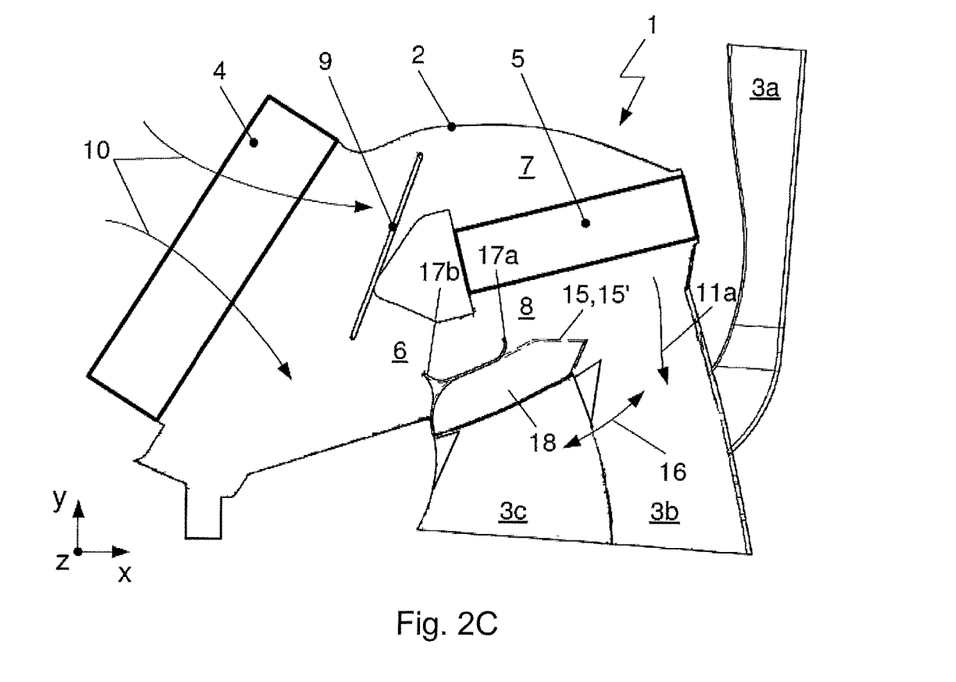
FIG. 2C: the air conditioning system of FIG. 2A with the device for guiding air in a second end position.

FIGS. 2A to 2C show an air conditioning system 1 with a device 15, 15' for guiding air with integrated air channels in the case of different arrangements of the device 15, 15' and different operating modes of the air conditioning system 1 in a side view. In FIG. 2A, the device 15, 15' is represented in a first end position and the air conditioning system 1 is represented in operation in the chiller mode, in FIG. 2B, the device 15, 15' is represented in an intermediate position and the air conditioning system 1 is represented in operation in a mixing mode, and in FIG. 2C the device 15, 15' is represented in a second end position.

In comparison to the air conditioning system 1' of FIG. 1, the air channels are integrated within the device 15, 15' designed as a movable flap and, depending on the function, are referred to as hot air paths or as cold air paths. The device 15, 15' is arranged, at the inlets into the air outlets 3b, 3c, in a manner so that it can be shifted in the directions 16. The air outlet 3a is again formed to be connected in parallel to the air outlet 3c, so that an air mass flow flowing into the air outlet 3c is also proportionately guided into the air outlet 3a. In the same way, the air outlet 3a is closed when the air outlet 3c is closed, and the air outlet 3a is opened when the air outlet 3c is opened.

In FIG. 2A the device 15, 15' for guiding the air is represented in a first end position in the operation of the air conditioning system 1 in the chiller mode in a side view. The temperature flap 9 is aligned in such a manner that the air mass flow which is guided over the heat exchanger surface of the evaporator 4 is led entirely through the cold air path 6. The hot air path 7 is closed by means of the temperature flap 9, so that no heat is transferred from the heating heat exchanger 5 to the air mass flow. Here, the device 15, 15' is led out of the air mass flow or arranged at the margin of the air mass flow which is guided through the cold air path 6 and is guided directly to the air outlet 3c. No air flows through the device 15, 15', in particular the air channels integrated therein. The device 15, 15' is arranged so that at least one opening of each air channel, that is to say an inlet or an outlet, lies on the housing 2 or elements of the housing 2, and is thus closed. The air outlet 3b is also closed by the device 15, 15'.

The air guide devices 17a, 17b constructed additionally on the surface of the device 15, 15', in particular the air guide devices 17b, are used for the targeted deflection of the air mass flow in the direction of the air outlet 3c.

FIG. 2B shows the device 15, 15' in an intermediate position in the operation of the air conditioning system 1 in a mixed mode in a side view. The temperature flap 9 is oriented in such a manner that the air mass flow guided over the heat exchanger surface of the evaporator 4 is divided into partial air mass flows, wherein a first partial air mass flow is guided as cold air through the cold air path 6 and a second partial air mass flow is guided through the hot air path 7 for heating. The heat is transferred from the heating heat exchanger 5 to the second partial air mass flow.

The device 15, 15' is here arranged in such a manner that air is applied to both the air outlet 3b and also the air outlet 3c. The two partial air mass flows guided through the flow paths 6, 7 are only partially mixed again in the mixing chamber 8. The inlet of the air outlet 3b in the area of the mixing chamber 8 is partially opened.

The first partial air mass flow led through the cold air path 6 is guided in a large proportion directly to the air outlet 3c, wherein the air guide devices 17a, 17b constructed on the surface of the device 15, 15', in particular the air guide devices 17b, are used for the targeted deflection of the first partial air mass flow in the direction of the air outlet 3c.

The second partial air mass flow heated as it flows over the heat exchanger surface of the heating heat exchanger 5 is divided, wherein a first portion is guided in flow direction 11a past the device 15, 15' into the air outlet 3b. The air outlet 3b consequently receives the heated partial air mass flow mostly or entirely.

A second portion of the heated partial air mass flow is guided in flow direction 11b through the at least one first air channel 18 formed so as to be integrated in the device 15, 15'. The first air channel 18 comprises an inlet 18a oriented in the direction of the mixing chamber 8 or in the direction of the heating heat exchanger 5, through which the hot air flows into the air channel 18 and thus the device 15, 15'. The hot air is subsequently guided through the air channel 18, which is closed on the side, and which is also referred to as hot air channel 18, to an outlet 18b, without being mixed with another partial air mass flow. The outlet 18b is here oriented in such a way that the hot air guided through the device 15, 15' flows out in the direction of the air outlet 3c and is mixed, after flowing out, with the cold air of the first partial air mass flow guided through the cold air path 6.

The air channel 18 is used thus for the targeted air guidance of the partial air mass flow flowing out of the heating heat exchanger 5 to the air outlet 3c, wherein the partial air mass flow is guided unmixed through the mixing chamber 8 and the device 15, 15'.

In addition, a portion of the first partial air mass flow led through the cold air path 6 can be guided substantially in opposite direction to the flow direction 11b of the hot air through a second air channel of the device 15, 15', which is not represented. The partial air mass flow here flows from the direction of the cold air path 6 into the device 15, 15' and in the direction of the air outlet 3b out of the device 15, 15'. After flowing out the device 15, 15', the partial air mass flow of the cold air is mixed with the partial air mass flow of the hot air which flows in flow direction 11a.

In FIG. 2C, the device 15, 15' for guiding the air is represented in a second end position in a side view. The device 15, 15' is here arranged in such a way that the air mass flow guided through the hot air path 7 in flow direction 11a is guided directly to the air outlet 3b. The device 15, 15', in particular the first air channel 18 integrated therein, is closed. In the same way, the air outlets 3a, 3c are closed by the device 15, 15'.

Depending on the orientation of the temperature flap 9, the air mass flow guided over the heat exchanger surface of the evaporator 4 is divided over the cold air path 6 and the hot air path 7. In an operating mode in which the cold air path 6 is also at least partially opened, the partial air mass flow guided through the cold air path 6 is mixed in the mixing chamber 8 with the partial air mass flow guided through the hot air path 7 and is subsequently led, as described, to the air outlet 3b. A portion of the air mass flow led through the cold air path 6 can also be guided through the second air channel, which is not represented, and thus through the device 15, 15' to the air outlet 3b.

Figure 3:
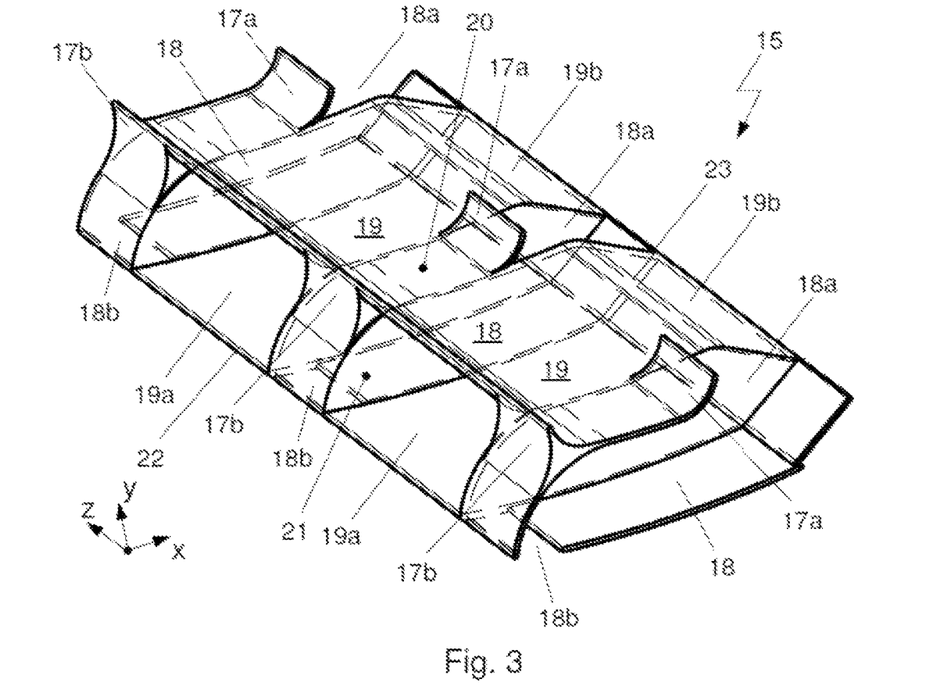
FIG. 3: device for guiding air with three integrated hot air channels and two integrated cold air channels.

In FIG. 3, the device 15 for guiding air is represented with five integrated air channels 18, 19, that is to say with three integrated hot air channels 18 and two integrated cold air channels 19.

The first air channels 18 and the second air channels 19 are each designed as continuous paths each with an inlet 18a, 19a and an outlet 18b, 19b. The air channels 18, 19 are in addition not connected to one another fluidically, so that the air mass flows guided through the air channels 18, 19 cannot be mixed with one another within the device 15.

The device 15 has an upper side 20, a lower side 21, which are oriented in planes defined by the horizontal direction x and the depth direction z, as well as a front side 22 and a back side 23 which are oriented substantially in the planes defined by the vertical direction y and the depth direction z. Here, the upper side 20 is arranged at a distance from the lower side 21, and the front side 22 is arranged at a distance from the back side 23, so that the device 15 in combination with the housing 2 encloses a volume.

The designations of the sides of the device 15 relate to the arrangement of the device 15 within the air conditioning system 1 when the device 15 is arranged substantially in a plane defined by the directions x and z. The upper side 20 here points upward in vertical direction y, while the lower side 21 points downward in vertical direction y. The front side 22 is oriented in horizontal direction x in the direction of the air mass flow flowing in from the cold air path 6, while the back side 23 is oriented in horizontal direction x facing the front side 22.

Between the outer hot air channels 18 and the inner hot air channel 18, a cold air channel 19 is arranged in each case. The air channels 18, 19 extend here substantially in horizontal direction x and are separated from one another by partitions. The partitions are oriented in planes defined by the vertical direction y and the horizontal direction x.

In the area of the hot air channels 18, the front side 22 and the back side 23 of the device 15 are closed. The hot air channels 18 extend from the upper side 20 to the lower side 21 of the device 15, wherein each hot air channel 18 comprises an inlet 18a and an outlet 18b. The inlets 18a are here formed on the upper side 20 and the outlets 18b are formed on the lower side 21 of the device 15. The inlets 18a and the outlets 18b are arranged offset with respect to one another in horizontal direction x, so that the air flows through the inlet 18a substantially in vertical direction y into the hot air channel 18, flows through the hot air channel 18 oriented in horizontal direction x, and subsequently flows out in vertical direction y through the outlet 18b from the hot air channel 18.

The inlets 18a of the hot air channels 18 are constructed with the hot air devices 17a which protrude in the area of the inlets 18a from the upper side 20 and have the width of the opening of the inlet 18a. The air guide devices 17a are shaped convexly in the flow direction of the hot air in order to promote the influx of the air into the hot air channel 18 and to minimize pressure losses.

In the area of the cold air channels 19, the upper side 20 and the lower side 21 of the device 15 are closed. The cold air channels 19 extend from the front side 22 to the back side 23 of the device 15, wherein each cold air channel 19 has an inlet 19a and an outlet 19b. The inlets 19a here are formed on the front side 22 and the outlets 19b are formed on the back side 23 of the device 15. The inlets 19a and the outlets 19b are each arranged so that they point in horizontal direction x, so that the air flows through the inlet 19a substantially in horizontal direction x into the cold air channel 19, flows through the cold air channel 19 oriented in horizontal direction x, and subsequently flows out in horizontal direction x through the outlet 19b from the cold air channel 19. Since the outlets 19b of the cold air channels 19 are formed at the transition of the upper side 20 and the back side 23, the air mass flow flowing out of the cold air channels 19 also has a flow component oriented in vertical direction y.

The inlets 19a of the cold air channels 19 are constructed with an air guide device 17b which, in the area of the inlets 19a, at the transition between the front side 22 and the upper side 20, protrudes from the upper side 20 and extends over the entire depth of the device 15. The air guide device 17b is shaped convexly in the area of the openings of the inlets 19a in the flow direction of the cold air in order to promote the influx of air into the cold air channels 19 and to minimize pressure losses. In the areas of the hot air channels 18, which are closed on the front side 22, the air guide device 17b is shaped concavely in order to guide the air mass flow along the front side 22 into the air outlet 3c.

Figure 4:
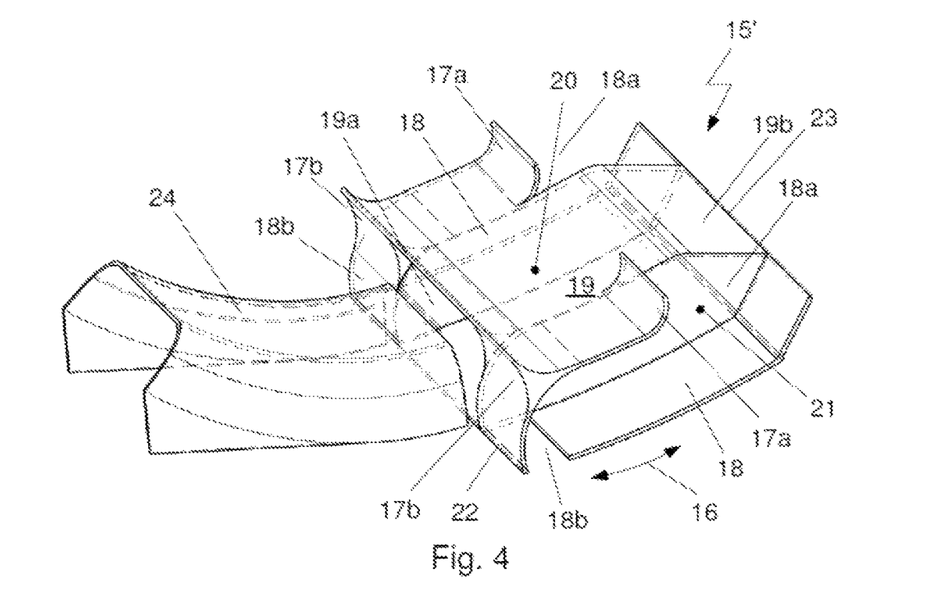
FIG. 4: device for guiding air with two integrated hot air channels, an integrated cold air channel and an upstream rigid inlet channel.

FIG. 4 shows the device 15' for guiding air with three integrated air channels 18, 19, that is to say with two integrated hot air channels 18, an integrated cold air channel 19 as well as an upstream rigid inlet channel 20. The device 15' differs from the device 15 of FIG. 3 in the design of the number of air channels 18, 19. Since the devices 15, 15' are otherwise be designed very similarly, reference is made here to the explanations concerning the device 15 of FIG. 3. The cold air channel 19 is arranged between the two hot air channels 18.

In addition, the device 15' can be combined with a stratification channel arranged rigidly, statically or stationarily. The stratification channel is designed here as inlet channel 24 for the cold air mass flow. Using the combination of the inlet channel and the device 15' for guiding air, it is possible, for example, to increase the maximum air throughput of the cold air channel 19 and prevent an undesired mixing of the partial air mass flows guided through the cold air path 6 and the hot air path 7 in the mixing chamber 8 in the area of the device 15'.

By shifting the device 15' in direction 16, the inlet channel 24 is introduced or integrated at least partially in the device 15', particularly in the cold air channel 19, or removed from the device 15'. Here the device 15' is shifted with the cold air channel 19 over the inlet channel 24 or moved away from the inlet channel 24. The flow cross sections of the inlet channel 24 and of the cold air channel 19 are geometrically similar and have the same shape, wherein the flow cross section and thus the outer dimensions of the inlet channel 24 are slightly smaller than the flow cross section and thus the outer dimensions of the cold air channel 19.

The inlet channel 24 can also be combined with the device 15 of FIG. 3. In addition, other such stratification channels can be formed.

LIST OF REFERENCE NUMERALS 1, 1' Air conditioning system
2 Housing
3a, 3b, 3c Air outlet
4 Evaporator
5 Heating heat exchanger
6 Flow path, cold air path
7 Flow path, hot air path
8 Mixing chamber
9 Temperature flap
10 Flow direction of the air
11 Flow direction of the air in hot air path 7
11a Flow direction of the air from the hot air path 7
11b Flow direction of the air through the device 15, 15'
12 Flow direction of the air through cold air path 6
13 Air flap
14 Stratification channel
15, 15' Device for guiding air
16 Direction of the shifting of the device 15, 15'
17a, 17b Air guide device
18 First air channel, hot air channel
18a Inlet hot air channel 18
18b Outlet hot air channel 18
19 Second air channel, cold air channel
19a Inlet cold air channel 19
19b Outlet cold air channel 19
20 Upper side of the device 15, 15'
21 Lower side of the device 15, 15'
22 Front side of the device 15, 15'
23 Back side of the device 15, 15'
24 Inlet channel
x Horizontal direction
y Vertical direction
z Depth direction

What is claimed is:

1. A device for guiding air for an air conditioning system of a motor vehicle, the air conditioning system including a first air outlet and a second air outlet arranged near the device, the device comprising: a first air channel formed within a volume enclosed by the device, the first air channel extending continuously from a first inlet of the volume to a first outlet of the volume, the device continuously slidable along a curvilinear direction between a first end position closing the first air outlet and a second end position closing the second air outlet; and a second air channel arranged separately from the first air channel within the volume, the second air channel extending continuously from a second inlet of the volume to a second outlet of the volume, wherein the air flows both through the first air channel and around a first end of the device to the first air outlet, and through the second air channel and around a second end of the device to the second air outlet, when the device is slidably positioned intermediate to the first and second end positions, wherein the device includes an upper side and a lower side spaced apart from each other in a vertical direction y, wherein the first air channel extends from the upper side of the device to the lower side of the device, and wherein the first inlet is formed on the upper side of the device and the first outlet is formed on the lower side of the device.

2. The device according to claim 1, wherein the device includes an air guide protruding from the upper side of the device near the first inlet.

3. The device according to claim 2, wherein the air guide has a width equal to a width of the first inlet.

4. The device according to claim 1, wherein the first inlet and the first outlet of the first air channel are arranged offset from one another along a horizontal direction x arranged perpendicular to the vertical direction y.

5. The device according to claim 4, wherein the first inlet and the first outlet are oriented to direct the air in the vertical direction y and the first air channel extends in the horizontal direction x.

6. The device according to claim 1, wherein the device includes a front side and a back side spaced apart from each other in a horizontal direction x, wherein the second air channel extends from the front side of the device to the back side of the device.

7. The device according to claim 6, wherein the second inlet is formed on the front side and the second outlet is formed on the back side.

8. The device according to claim 7, wherein the device includes an air guide protruding therefrom at a transition from the front side to the upper side, the air guide extending along an entirety of a depth of the device measured in a direction z extending perpendicular to each of the vertical direction y and the horizontal direction x.

9. The device according to claim 1, wherein the device is adjustable along a first direction toward an inlet channel arranged with a static structure, wherein the first air channel of the device at least partially overlaps the inlet channel therein.

10. An air conditioning system for a motor vehicle, comprising: a housing including a first flow path having a first air mass flow having a first temperature directed therethrough, a second flow path having a second air mass flow having a second temperature directed therethrough, a first air outlet, a second air outlet, and a mixing chamber, the first flow path and the second flow path each leading to the mixing chamber, the first air outlet and the second air outlet disposed downstream of the mixing chamber; a device guiding air within the mixing chamber of the housing, the device including a first air channel and a second air channel, the first air channel formed within a volume enclosed by the device, the first air channel extending continuously from a first inlet of the volume located on an upper side of the device, to a first outlet of the volume located on a lower side of the device, the second air channel extending continuously from a second inlet of the volume to a second outlet of the volume, wherein the upper side is spaced apart from the lower side in a vertical direction y, and the device is continuously slidable along a curvilinear direction within the mixing chamber between a first end position closing the first air outlet and a second end position closing the second air outlet, wherein the air flows both through the first air channel and around a first end of the device to the first air outlet, and through the second air channel and around a second end of the device to the second air outlet, when the device is slidably positioned intermediate to the first and second end positions.

11. The air conditioning system according to claim 10, wherein the first air channel and the second air channel are arranged separately from one another within the volume, and the second inlet formed in a front side of the device and the second outlet formed in a back side of the device, and the front side is spaced apart from the back side in a horizontal direction x arranged perpendicular to the vertical direction y.

12. The air conditioning system according to claim 11, wherein the device includes a first air guide and a second air guide, the first air guide protruding from the upper side of the device near the first inlet, the second air guide protruding from the device at a transition from the front side to the upper side and extending along an entirety of a depth of the device measured along a direction z extending perpendicular to each of the vertical direction y and the horizontal direction x.

13. The air conditioning system according to claim 12, wherein the first air guide has a width equal to a width of the first inlet.

14. The air conditioning system according to claim 10, wherein the device is adjustable along the first direction toward an inlet channel arranged with a static structure, wherein the first air channel of the device at least partially overlaps the inlet channel therein.

15. The air conditioning system according to claim 10, wherein a temperature flap is disposed downstream of an evaporator in a direction of flow of an entire air mass flow passing through the evaporator, the temperature flap controlling a first portion of the entire air mass flow entering the first flow path as the first air mass flow and a second portion of the entire air mass flow entering the second flow path as the second air mass flow.

16. The air conditioning system according to claim 15, wherein the second flow path includes a heating heat exchanger of the air conditioning system for heating the second air mass flow.

* * * * *